(12) United States Patent
Xu et al.

(10) Patent No.: US 11,868,604 B2
(45) Date of Patent: Jan. 9, 2024

(54) DISPLAY PROCESSING METHOD AND APPARATUS

(71) Applicant: Huawei Technologies Co., Ltd., Shenzhen (CN)

(72) Inventors: Jie Xu, Shanghai (CN); Xuan Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 16/619,786

(22) PCT Filed: Jun. 5, 2017

(86) PCT No.: PCT/CN2017/087217
§ 371 (c)(1),
(2) Date: Dec. 5, 2019

(87) PCT Pub. No.: WO2018/223270
PCT Pub. Date: Dec. 13, 2018

(65) Prior Publication Data
US 2020/0125229 A1    Apr. 23, 2020

(51) Int. Cl.
*G06F 3/0488* (2022.01)
*G06F 9/451* (2018.01)
(Continued)

(52) U.S. Cl.
CPC .......... *G06F 3/0488* (2013.01); *G06F 1/3206* (2013.01); *G06F 1/3265* (2013.01);
(Continued)

(58) Field of Classification Search
CPC .... G06F 1/3206; G06F 1/3265; G06F 3/0488; G06F 9/451; G06F 1/3209; G06F 1/3231;
(Continued)

(56) References Cited

U.S. PATENT DOCUMENTS 8,826,178 B1    9/2014  Zhang
2008/0167834 A1*  7/2008  Herz ..................... G06F 1/3231
                                                                702/150
(Continued)

FOREIGN PATENT DOCUMENTS

CN    104077518 A    10/2014
CN    104182028 A    12/2014
(Continued)

OTHER PUBLICATIONS

Machine Translation and Abstract of Chinese Publication No. CN104182028, Dec. 3, 2014, 39 pages.
(Continued)

*Primary Examiner* — Temesghen Ghebretinsae
*Assistant Examiner* — Sosina Abebe
(74) *Attorney, Agent, or Firm* — Conley Rose, P.C.

(57) ABSTRACT

If a first tap is detected on a touch screen of an electronic device when the touch screen is in a black screen state, the touch screen displays a fingerprint pattern in a target display area to prompt a user to enter a fingerprint in the target display area. If the electronic device is picked up when the touch screen is in the black screen state, the touch screen displays the fingerprint pattern in the target display area to prompt the user to enter the fingerprint in the target display area.

19 Claims, 13 Drawing Sheets

(51) Int. Cl.
*G06F 1/3206* (2019.01)
*G06F 1/3234* (2019.01)
*G06V 40/12* (2022.01)
*G06V 40/13* (2022.01)
*G06V 40/60* (2022.01)

(52) U.S. Cl.
CPC .............. *G06F 9/451* (2018.02); *G06V 40/12* (2022.01); *G06V 40/13* (2022.01); *G06V 40/67* (2022.01)

(58) Field of Classification Search
CPC . G06F 1/325; G06F 3/04883; G06K 9/00006; G06V 40/12; Y02D 10/00
See application file for complete search history.

(56) References Cited

U.S. PATENT DOCUMENTS

| | | | |
|---|---|---|---|
| 2009/0150993 A1 | 6/2009 | Tilley | |
| 2010/0257490 A1* | 10/2010 | Lyon | H04M 1/724 715/863 |
| 2010/0304757 A1 | 12/2010 | Yoshioka | |
| 2013/0342672 A1 | 12/2013 | Gray et al. | |
| 2014/0007227 A1 | 1/2014 | Morinaga et al. | |
| 2015/0127965 A1 | 5/2015 | Hong et al. | |
| 2015/0146945 A1* | 5/2015 | Han | H04L 63/0815 382/125 |
| 2016/0034741 A1 | 2/2016 | Lan et al. | |
| 2017/0316250 A1* | 11/2017 | Roh | H04M 1/72519 |
| 2018/0165507 A1 | 6/2018 | Li | |
| 2019/0019048 A1 | 1/2019 | Deng et al. | |

FOREIGN PATENT DOCUMENTS

| | | |
|---|---|---|
| CN | 104662600 A | 5/2015 |
| CN | 105353965 A | 2/2016 |
| CN | 105388992 A | 3/2016 |
| CN | 105407191 A | 3/2016 |
| CN | 105446451 A | 3/2016 |
| CN | 105809141 A | 7/2016 |
| CN | 105843358 A | 8/2016 |
| CN | 106200878 A | 12/2016 |
| CN | 106527668 A | 3/2017 |
| CN | 106650384 A | 5/2017 |
| CN | 106716431 A | 5/2017 |
| CN | 106774803 A | 5/2017 |

OTHER PUBLICATIONS

Machine Translation and Abstract of Chinese Publication No. CN105388992, Mar. 9, 2016, 18 pages.
Machine Translation and Abstract of Chinese Publication No. CN105446451, Mar. 30, 2016, 14 pages.
Machine Translation and Abstract of Chinese Publication No. CN105843358, Aug. 10, 2016, 22 pages.
Machine Translation and Abstract of Chinese Publication No. CN106200878, Dec. 7, 2016, 16 pages.
Machine Translation and Abstract of Chinese Publication No. CN106527668, Mar. 22, 2017, 16 pages.
Machine Translation and Abstract of Chinese Publication No. CN106650384, May 10, 2017, 11 pages.
Foreign Communication From A Counterpart Application, Chinese Application No. 201780007924.6, Chinese Office Action dated Nov. 29, 2019, 6 pages.
Foreign Communication From A Counterpart Application, PCT Application No. PCT/CN2017/087217, English Translation of International Search Report dated Feb. 24, 2018, 2 pages.
Foreign Communication From A Counterpart Application, PCT Application No. PCT/CN2017/087217, English Translation of Written Opinion dated Feb. 24, 2018, 4 pages.

* cited by examiner

DISPLAY PROCESSING METHOD AND APPARATUS

CROSS-REFERENCE TO RELATED APPLICATIONS

This application is a national stage application of International Patent Application No. PCT/CN2017/087217, filed on Jun. 5, 2017, which is hereby incorporated by reference in its entirety.

TECHNICAL FIELD

Embodiments of the present invention relate to the field of communications technologies, and in particular, to a display processing method and an apparatus.

BACKGROUND

A fingerprint recognition technology may be used for functions such as screen wake-up, unlocking, and mobile payment of a terminal. As a size of a terminal touchscreen becomes larger, a fingerprint collection device may be integrated with the touchscreen to implement a fingerprint recognition function of the terminal.

As shown in FIG. 1, a fingerprint collection device 102 may be integrated in an area of the touchscreen, for example, an area 101. In this way, after a user's finger touches the area 101, the fingerprint collection device 102 in the area 101 may be triggered to collect a fingerprint of the user, so as to complete functions such as fingerprint unlocking or fingerprint payment.

To enable the user to accurately touch the area 101, when the terminal enters an application scenario (for example, a lock screen state, a black screen state, or a fingerprint payment state) related to fingerprint collection, the terminal usually displays a fingerprint pattern in the area 101 or lights the area 101, so as to prompt the user to touch the area. A black screen state is used as an example. Because the terminal does not know when the user touches the area 101 to perform fingerprint unlocking, the terminal needs to keep lighting the area 101 in the black screen state to prompt the user to touch the area. In this case, a display screen in the area 101 is always in a working state, which easily causes device aging and even screen burn-in, and increases power consumption of the terminal.

SUMMARY

Embodiments of the present invention provide a display processing method and an apparatus. When a fingerprint collection device is integrated in a touchscreen, a probability of screen burn-in of the touchscreen can be reduced, and power consumption of a terminal is reduced.

The following technical solutions are used in the embodiments of the present invention to achieve the foregoing objective.

According to a first aspect, an embodiment of the present invention provides a display processing method, including: instructing to display prompt information on a display screen of a terminal, where the prompt information is used to prompt a user to enter a fingerprint in a target display area in which a fingerprint collection device is disposed; obtaining first scenario description data of the terminal, where the first scenario description data is used to indicate a current application scenario of the terminal; determining, based on the scenario description data, that the terminal is currently in a motion scenario or a call scenario; and instructing to stop displaying the prompt information in the target display area.

In other words, when the terminal displays the prompt information to the user in the target display area in which the fingerprint collection device is disposed, if the terminal determines, based on a current application scenario, that the user does not need to collect a fingerprint in this case, the terminal may stop displaying the prompt information in the target display area. In this way, in comparison with keeping lighting a display area on a touchscreen in the prior art, in this embodiment of the present invention, the target display area in which the fingerprint collection device is integrated does not need to be always in a working state, thereby reducing a probability of screen burn-in in the area, and reducing power consumption of the terminal, In a possible design method, the foregoing first scenario description data includes posture information of the user when the user uses the terminal; and the determining, based on the scenario description data, that the terminal is currently in a motion scenario includes: when the posture information is used to indicate that the user holds the terminal while walking or running, determining that the terminal is currently in the motion scenario. In other words, when the terminal is in the motion scenario, it may be considered that the user does not need to use a fingerprint collection function in this case. Therefore, display of the prompt information may be stopped, thereby reducing power consumption of the terminal, and avoid screen burn-in.

In a possible design method, the first scenario description data includes a working status of an earpiece and a working status of an optical proximity sensor, and the determining, based on the scenario description data, that the terminal is currently in a call scenario includes: when it is determined that the earpiece is playing sound, and the optical proximity sensor detects that a light shielding object exists around the earpiece, determining that the terminal is currently in the call scenario. Alternatively, the first scenario description data may also include a working status of an optical proximity sensor and a working status of a distance sensor; the determining, based on the scenario description data, that the terminal is currently in a call scenario includes: when the terminal is in a voice call state, the distance sensor detects that an object exists within a preset distance from the terminal, and the optical proximity sensor detects that a light shielding object is disposed around the earpiece, determining that the terminal is currently in the call scenario. In other words, when the terminal is in a call state in an earpiece mode, it may be considered that the user does not need to use a fingerprint collection function in this case. Therefore, display of the prompt information may be stopped, thereby reducing power consumption of the terminal, and avoid screen burn-in.

In a possible design method, after the instructing to stop displaying the prompt information in the target display area, the method further includes: obtaining second scenario description data of the terminal, where the second scenario description data is used to indicate a current application scenario of the terminal; and when the second scenario description data indicates that the user needs to use a fingerprint collection function, instructing to display the prompt information in the target display area.

In this way, the terminal may determine, in a timely and accurate manner based on the second scenario description data, that the current user needs to use the fingerprint collection function, and further outputs the prompt information in the target display area in which the fingerprint collection device is disposed, so that the user can accurately learn of a specific location for subsequently entering the fingerprint on the touchscreen, and recognition efficiency of fingerprint recognition on the screen is improved.

In a possible design method, the second scenario description data includes posture information of the user when the user uses the terminal; and the determining, based on the scenario description data, that the user needs to use a fingerprint collection function includes: when the posture information is used to indicate that the user picks up the terminal, determining that the user needs to use the fingerprint collection function. In other words, when the terminal is in a lifting scenario, it may be considered that the user needs to use the fingerprint collection function in this case. Therefore, the prompt information may be displayed in the target display area, so that the user can accurately learn of a specific location for subsequently entering the fingerprint on the touchscreen.

In a possible design method, the second scenario description data includes a trigger event executed by the user on the terminal; and the determining, based on the scenario description data, that the user needs to use a fingerprint collection function includes: when the trigger event is a preset operation of waking up a terminal screen, determining that the user needs to use the fingerprint collection function. In other words, when the user intentionally wakes up the terminal screen, it may be considered that the user needs to use the fingerprint collection function in this case. Therefore, the prompt information may be displayed in the target display area, so that the user can accurately learn of a specific location for subsequently entering the fingerprint on the touchscreen.

In a possible design method, the second scenario description data includes a real-time signal received by the terminal; the determining, based on the scenario description data, that the user needs to use a fingerprint collection function includes: when the real-time signal is a new incoming call event or a new message event, determining that the user needs to use the fingerprint collection function. In other words, when the terminal receives a new incoming call or message, it may be considered that the user needs to use the fingerprint collection function in this case. Therefore, the prompt information may be displayed in the target display area, so that the user can accurately learn of a specific location for subsequently entering the fingerprint on the touchscreen.

In a possible design method, the instructing to display prompt information on a display screen of a terminal includes: instructing the terminal to light the target display area; or instructing to display a fingerprint pattern in the target display area.

In a possible design method, when the user needs to use the fingerprint collection function, the method further includes setting the fingerprint collection device to a standby state. In this way, once the user's finger is pressed on the fingerprint collection device, the fingerprint collection device may immediately start collecting fingerprint information, thereby increasing a response speed of collecting a fingerprint by the terminal.

In a possible design method, after the determining, based on the first scenario description data, that the terminal is currently in a motion scenario or a call scenario, the method further includes setting the fingerprint collection device to an inactive state. In this way, even if a finger is pressed on the fingerprint collection device, the fingerprint collection device does not collect a fingerprint, so as to avoid an unintentional operation caused when the user unintentionally touches the fingerprint collection device during an operation on the screen, and power consumption of the terminal can be reduced.

In a possible design method, after the instructing to display prompt information on a display screen of a terminal, the method further includes: detecting an operation event of the user in the target display area; and in response to an operation event that meets a preset condition, collecting a fingerprint of the user by using the fingerprint collection device; where the preset condition includes at least one of the following: pressing force of the operation event is greater than a first preset value; duration of the operation event is greater than a second preset value; movement displacement of the operation event is greater than a third preset value; and a quantity of touch times of the operation event is greater than a fourth preset value.

In other words, when it is detected that the user operates the target display area of the touchscreen, the fingerprint collection device is triggered to collect the fingerprint of the user only when the operation event meets the preset condition. In this way, a phenomenon that a user contacts the target display area by mistake and triggers the terminal to collect the fingerprint of the user is avoided.

According to a second aspect, an embodiment of the present invention provides a. terminal, including: a display unit, configured to display prompt information on a display screen of the terminal, where the prompt information is used to prompt a user to enter a fingerprint in a target display area in which a fingerprint collection device is disposed; an obtaining unit, configured to obtain first scenario description data of the terminal, where the first scenario description data is used to indicate a current application scenario of the terminal; a determining unit, configured to determine, based on the scenario description data, that the terminal is currently in a motion scenario or a call scenario; and an execution unit, configured to instruct to stop displaying the prompt information in the target display area.

In a possible design method, the first scenario description data includes posture information of the user when the user uses the terminal; and the determining unit is specifically configured to: when the posture information is used to indicate that the user holds the terminal while walking or running, determine that the terminal is currently in the motion scenario.

In a possible design method, the first scenario description data includes a working status of an earpiece and a working status of an optical proximity sensor; and the determining unit is specifically configured to: when the earpiece is playing sound, and the optical proximity sensor detects that a light shielding object is disposed around the earpiece, determine that the terminal is currently in the call scenario.

In a possible design method, the obtaining unit is further configured to obtain second scenario description data of the terminal, where the second scenario description data is used to indicate a current application scenario of the terminal; and the display unit is further configured to: when the second scenario description data indicates that the user needs to use a fingerprint collection function, display the prompt information in the target display area.

In a possible design method, the second scenario description data includes posture information of the user when the user uses the terminal; and the determining unit is further configured to: when the trigger event is a preset operation of waking up a terminal screen, determine that the user needs to use the fingerprint collection function.

In a possible design method, the second scenario description data includes a trigger event executed by the user on the terminal; and the determining unit is further configured to: when the trigger event is a preset operation of waking up a terminal screen, determine that the user needs to use the fingerprint collection function.

In a possible design method, the second scenario description data includes a real-time signal received by the terminal; and the determining unit is further configured to: when the real-time signal is a new incoming call event or a new message event, determine that the user needs to use the fingerprint collection function.

In a possible design method, the display unit is specifically configured to light the target display area, or display a fingerprint pattern in the target display area.

In a possible design method, the execution unit is further configured to: when the user needs to use the fingerprint collection function, set the fingerprint collection device to a standby state.

In a possible design method, the execution unit is further configured to set the fingerprint collection device to an inactive state.

In a possible design method, the obtaining unit is further configured to detect an operation event of the user in the target display area; and the execution unit is further configured to: in response to an operation event that meets a preset condition, collect a fingerprint of the user by using the fingerprint collection device; where the preset condition includes at least one of the following: pressing force of the operation event is greater than a first preset value; duration of the operation event is greater than a second preset value; movement displacement of the operation event is greater than a third preset value; and a quantity of touch times of the operation event is greater than a fourth preset value.

According to a third aspect, an embodiment of the present invention provides a terminal, including: a processor, a memory, a bus, and a communications interface, where the memory is configured to store a computer-executable instruction; the processor and the memory are connected by using the bus; and when the terminal runs, the processor executes the computer-executable instruction stored in the memory, so that the terminal performs any one of the foregoing display processing methods.

According to a fourth aspect, an embodiment of the present invention provides a computer-readable storage medium. The computer-readable storage medium stores an instruction. When the instruction is run on any one of the foregoing terminals, the terminal is enabled to perform any one of the foregoing display processing methods.

According to a fifth aspect, an embodiment of the present invention provides a computer program product including an instruction, and when the computer program product is run on any one of the foregoing terminals, the terminal is enabled to perform any one of the foregoing display processing methods.

In the embodiments of the present invention, names of the terminals constitute no limitation on the devices. In actual implementation, these devices may appear with other names. As long as their functions are similar to those in the embodiments of the present invention, the various devices fall within the scope of the claims of the present invention and the equivalents thereof.

In addition, for technical effects brought by any design in the second aspect to the fifth aspect, refer to technical effects brought by different design methods in the foregoing first aspect. Details are not described herein.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions in the embodiments of the present invention, unless otherwise stated, "a plurality of" means two or more than two.

The embodiments of the present invention provide a display processing method. A terminal may obtain scenario description data of the terminal, to determine a current application scenario of the terminal. For example, the terminal is currently in a call scenario, a running scenario, or a floating touch scenario. Then the terminal may further determine whether a user needs to use a fingerprint collection function in the current application scenario, that is, whether the user has an intention of using a fingerprint recognition function. For example, in a fingerprint payment scenario, the user needs to enter a fingerprint to complete an identity authentication and payment process. However, when the terminal is put into a pocket or a backpack by the user, the fingerprint collection function does not need to be enabled.

In this way, when the user needs to use the fingerprint collection function, the terminal may display prompt information to the user in a target display area (that is, an area on a touchscreen) in which a fingerprint collection device is disposed, to prompt the user to enter a fingerprint in the target display area.

Correspondingly, when the user does not need to use the fingerprint collection function, the terminal may stop displaying the prompt information in the target display area.

It can be learned that, the terminal displays prompt information to the user in the target display area of the touchscreen only when the terminal determines that the user needs to use the fingerprint collection function, so that the user can be clear of a specific location in which the fingerprint is entered on the touchscreen. In comparison with keeping lighting a display area in which a fingerprint collection device is integrated in a touchscreen in the prior art, in the embodiments of the present invention, the target display area in which the fingerprint collection device is integrated does not need to be always in a working state, thereby reducing a probability of screen burn-in in the area, and reducing power consumption of the terminal.

In addition, the foregoing display processing method provided in the embodiments of the present invention may be applied to any terminal such as a mobile phone, a wearable device, an AR (augmented reality)/VR (virtual reality) device, a tablet computer, a notebook computer, a UMPC (ultra-mobile personal computer), a nethook, or a PDA (personal digital assistant). This is not limited in the embodiments of the present invention.

Figure 1:
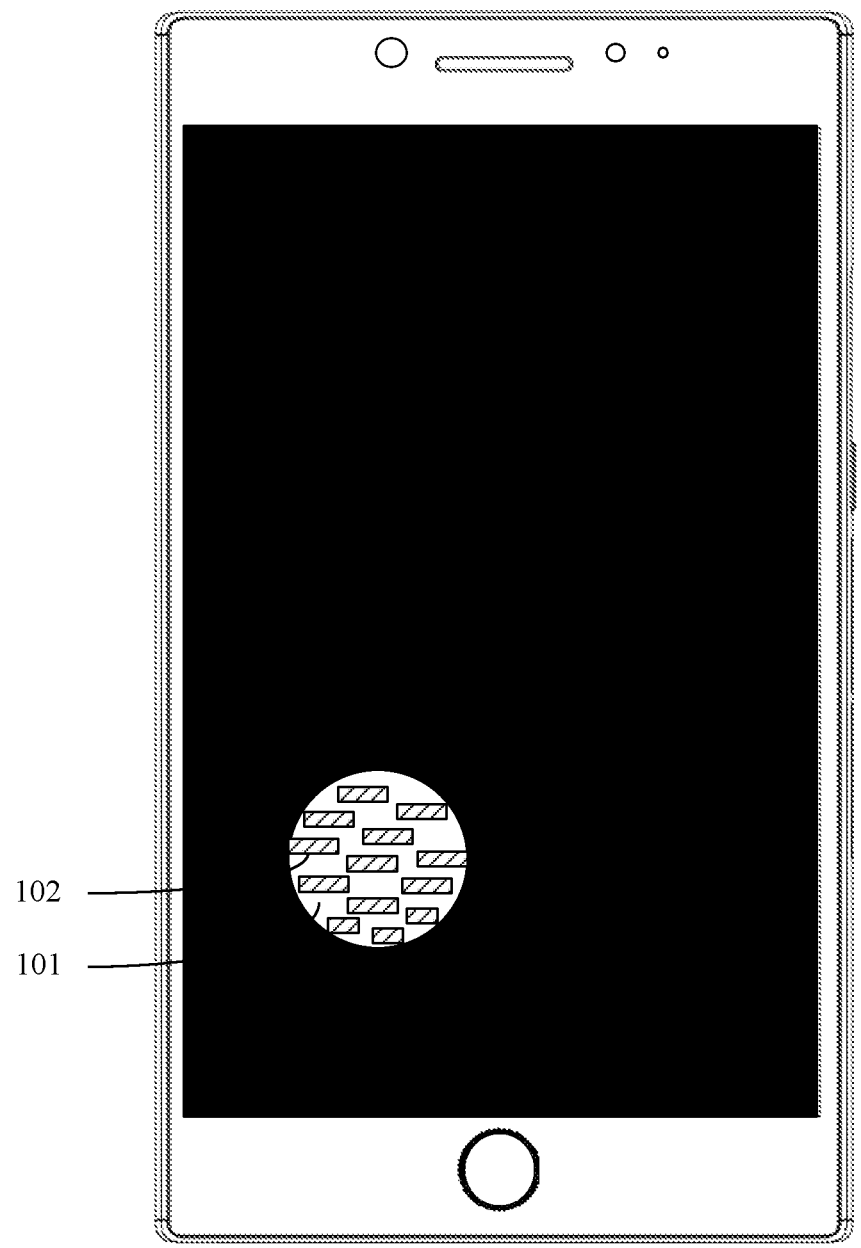
FIG. 1 is a schematic diagram of an application scenario of a fingerprint on a screen in the prior art.
Figure 2:
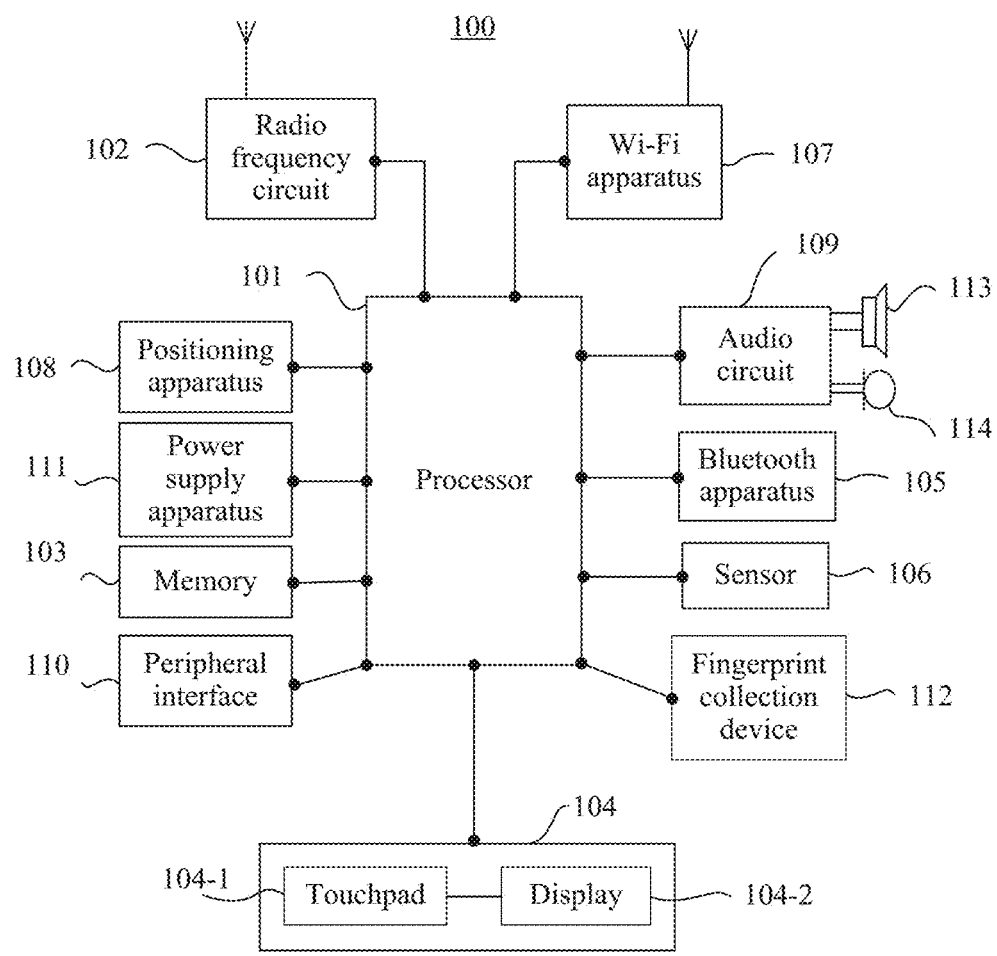
FIG. 2 is a schematic structural diagram 1 of a terminal according to an embodiment of the present invention.

As shown in FIG. 2, the terminal in the embodiments of this application may be a mobile phone 100. The following describes the embodiments in detail by using the mobile phone 100 as an example. It should be understood that the mobile phone 100 shown in the figure is merely an example of the terminal, and the mobile phone 100 may have more or fewer components than those shown in the figure and may combine two or more components or have different component configurations.

As shown in FIG. 2, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may perform communication by using one or more communications buses or signal cables (not shown in FIG. 2). A person skilled in the art may understand that a hardware structure shown in FIG. 2 does not constitute a limitation on the mobile phone, and the mobile phone 100 may include more or fewer components than those shown in the figure, or may combine some components, or have different component arrangements.

The following describes the components of the mobile phone 100 in detail with reference to FIG. 2, The processor 101 is a control center of the mobile phone 100. The processor 101 is connected to all parts of the mobile phone 100 by using various interfaces and lines, and runs or performs an application program (Which may be referred to as App for short in the following) stored in the memory 103 and invokes data stored in the memory 103, to perform various functions of the mobile phone 100 and process data. In some embodiments, the processor 101 may include one or more processing units. For example, the processor 101 may be a Kirin 960 chip manufactured by Huawei Technologies Co., Ltd.

The radio frequency circuit 102 may be configured to receive and send a radio signal in an information receiving and sending process or in a call process. In particular, after receiving downlink data from a base station, the radio frequency circuit 102 may send the downlink data to the processor 101 for processing. In addition, the radio frequency circuit 102 sends uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Any communication standard or protocol may be used for the wireless communication, and includes but is not limited to a Global System for Mobile Communications, a general packet radio service, Code Division Multiple Access, Wideband Code Division Multiple Access, Long Term Evolution, an email, a short message service, and the like.

The memory 103 is configured to store an application program and data. The processor 101 runs the application program and the data stored in the memory 103, to perform various functions of the mobile phone 100 and process data. The memory 103 mainly includes a program storage area and a data storage area. The program storage area may store an operating system, and an application program required by at least one function (for example, a sound play function or an image play function). The data storage area may store data (for example, audio data or a phone book) created based on use of the mobile phone 100. In addition, the memory 103 may include a high-speed random access memory, or may include a nonvolatile memory such as a magnetic disk storage device, a flash storage device, or another volatile solid-state storage device. The memory 103 may store various operating systems such as an iOS operating system developed by Apple and an Android operating system developed by Google.

The touchscreen 104 may include a touchpad 104-1 and a display 104-2. The touchpad 104-1 can collect a touch event performed by a user on or near the mobile phone 100 (for example, an operation performed by the user on the touchpad 104-1 or near the touchpad 104-1 by using any proper object such as a finger or a stylus), and send collected touch information to another component such as the processor 101. The touch event performed by the user near the touchpad 104-1 may be referred to as a floating touch. The floating touch may mean that the user does not need to directly touch the touchpad for selecting, moving, or dragging an object (for example, an icon), and the user only needs to be near the terminal to perform a desired function. In an application scenario of the floating touch, terms such as "touch" and "contact" do not mean to directly touch the touchscreen, but to be near or close to the touchscreen. The touchpad 104-1 on which the floating touch can be performed may be implemented by using technologies such as a capaci five technology, an infrared light sensing technology, or an ultrasonic technology. In addition, the touchpad 104-1 may be implemented in a plurality of types such as a resistive type, a capacitive type, an infrared type, or a surface acoustic wave type. The display (also referred to as a display screen) 104-2 may be configured to display information input by the user or information provided for the user, and various menus of the mobile phone 100. The display 104-2 can be configured in a form of a liquid crystal display, an organic light emitting diode, or the like. The touchpad 104-1 may cover the display 104-2. When detecting the touch event on or near the touchpad 104-1, the touchpad 104-1 transfers the touch event to the processor 101 to determine a type of the touch event. Then, the processor 101 can provide corresponding visual output on the display 104-2 based on the type of the touch event.

Although the touchpad 104-1 and the display screen 104-2 in FIG. 2 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking layers of materials. In this embodiment of this application, only the touchpad (layer) and the display screen (layer) are displayed, and another layer is not recorded in this embodiment of this application. In addition, in some other embodiments of this application, the touchpad 104-1 may cover the display 104-2, and a size of the touchpad 104-1 is greater than a size of the display screen 104-2, so that the display screen 104-2 is all covered by the touchpad 104-1. Alternatively, the touchpad 104-1 may be configured on the front of the mobile phone 100 in a full panel manner. In other words, the mobile phone can sense each touch performed by the user on the front of the mobile phone 100. In this way, full touch control experience on the front of the mobile phone can be implemented. In some other embodiments, the touchpad 104-1 is configured on the front of the mobile phone 100 in a full panel manner, and the display screen 104-2 may also be configured on the front of the mobile phone 100 in a full panel manner. In this way, a bezel-less (Bezel) structure can be implemented on the front of the mobile phone.

In this embodiment of this application, the mobile phone 100 may further have a fingerprint recognition function. For example, a fingerprint collection device 112 may be configured on the touchscreen 104 to implement the fingerprint recognition function. In other words, the fingerprint collection device 112 may be integrated with the touchscreen 104 to implement the fingerprint recognition function of the mobile phone 100. In this case, the fingerprint collection device 112 is configured on the touchscreen 104, and may be a part of the touchscreen 104, or may be configured on the touchscreen 104 in another manner. In addition, the fingerprint collection device 112 may be further implemented as a full-panel fingerprint collection device. Therefore, the touchscreen 104 may be considered as a panel on which fingerprint recognition can be performed at any location. The fingerprint collection device 112 may send a collected fingerprint to the processor 101, so that the processor 101 processes the fingerprint (for example, fingerprint verification). A main component of the fingerprint collection device 112 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, and the like.

Figure 3A:
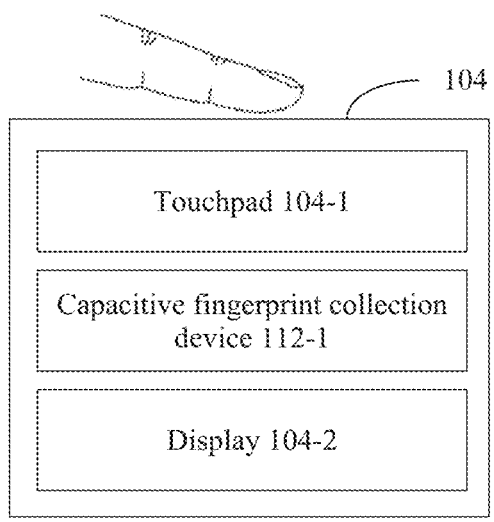
FIG. 3(a) and FIG. 3(b) are a schematic structural diagram of a display screen according to an embodiment of the present invention.
Figure 3B:
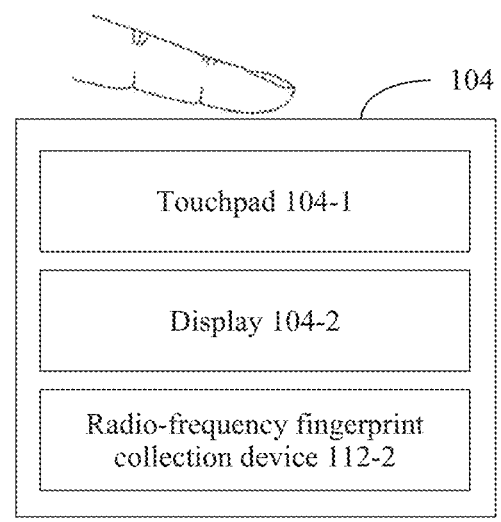

Optionally, as shown in (a) in FIG. 3, the fingerprint collection device 112 may be a capacitive collection device 112-1. In this case, the touchscreen 104 may specifically include the capacitive fingerprint collection device 112-1, the touchpad 104-1, and the display 104-2. The display 104-2 is located at the lowest layer of the touchscreen 104, the touchpad 104-1 is located at the highest layer of the touchscreen 104, and the capacitive collection device 112-1 is located between the touchpad 104-1 and the display 104-2.

In a specific implementation, locations of a ridge and a valley of a fingerprint may be determined based on different capacitance values formed by the ridge and valley of the fingerprint and capacitance sensing particles of the capacitive collection device 112-1, so as to obtain fingerprint information. Further, capacitive sensing particles on each pixel on the screen may be charged in advance, so that the capacitive sensing particles reach a preset threshold. When a user's finger touches the touchscreen 104, because there is a preset relationship between a capacitance value and a distance, different capacitance values are formed at locations of the ridge and the valley, and then discharge is performed through a discharge current. Because capacitance values respectively corresponding to the ridge and the valley are different, discharge speeds of pixels respectively corresponding to the ridge and the valley are also different. A discharge speed of pixels corresponding to the ridge is slow, and a discharge speed of pixels corresponding to the valley is fast, Therefore, fingerprint information of the user may be obtained by charging and discharging the pixels corresponding to the ridge and the valley.

Optionally, as shown in (b) in FIG. 3, the fingerprint collection device 112 may be a radio-frequency fingerprint collection device 112-2. In this case, the touchscreen 104 may include the radio-frequency fingerprint collection device 112-2, the touchpad 104-1, and the display 104-2. The radio-frequency fingerprint collection device 112-2 is located at the lowest layer of the touchscreen 104, the touchpad 104-1 is located at the highest layer of the touchscreen 104, and the display 104-2 is located between the touchpad 104-1 and the radio-frequency fingerprint collection device 112-2.

In a specific implementation, when light reaches a surface of the touchpad 104-1 on which a fingerprint is left through pressing, the radio-frequency fingerprint collection device 112-2 may absorb reflected light by using a CCD (charge coupling device), so as to obtain fingerprint information. Further, because depths of a ridge and a valley of a fingerprint on the touchpad 104-1 are different, and grease and water exist between the skin and the touchpad 104-1, the light undergoes total reflection when the light reaches a location of the valley via the touchpad 104-1, but does not undergo total reflection when reaching a location of the ridge of the fingerprint. Part of the light is absorbed by the touchpad 104-1 or scattered to another place through diffuse reflection, so that fingerprint information is formed on the CCD.

In addition, for a specific technical solution of integrating a fingerprint collection device in a touchscreen in this embodiment of this application, refer to patent application No. US 2015/0036065 A1, entitled "FINGERPRINT SENSOR IN ELECTRONIC DEVICE", announced by the United States Patent and Trademark Office, which is incorporated herein by reference in the embodiments of this application.

The mobile phone 100 may further include the Bluetooth apparatus 105, configured to exchange short-range data between the mobile phone 100 and another terminal (for example, a mobile phone or a smartwatch). The Bluetooth apparatus in this embodiment of this application may be an integrated circuit, a Bluetooth chip, or the like.

The mobile phone 100 may further include at least one sensor 106 such as a light sensor, a motion sensor, and another sensor. Specifically, the light sensor may include an ambient light sensor and a optical proximity sensor. The ambient light sensor may adjust Iwninance of the display of the touchscreen 104 based on brightness of ambient light, and the proximity sensor may turn off a power supply of the display when the mobile phone 100 moves to an ear. As a type of motion sensor, an accelerometer sensor may detect values of acceleration in all directions (usually, three axes), may detect a value and a direction of gravity when the sensor is stationary, and may be used in an application for identifying a mobile phone posture (such as screen switching between a landscape mode and a portrait mode, a related game, or magnetometer posture calibration), a function related to vibration identification (such as a pedometer or a knock), and the like. Other sensors such as a gyroscope, a barometer, a hygrometer, a thermometer, and an infrared sensor may be further disposed on the mobile phone 100. Details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user receive and send an email, browse a web page, access streaming media, and the like. The Wi-Fi apparatus 107 provides a wireless broadband Internet access for the user. In some other embodiments, the Wi-Fi apparatus 107 may also be used as a Wi-Fi wireless access point, and may provide Wi-Fi network access for another terminal.

The positioning apparatus 108 is configured to provide a geographic location for the mobile phone 100. It may be understood that the positioning apparatus 108 may be specifically a receiver of a positioning system such as a Global Positioning System (GPS), a BeiDou Navigation Satellite System, or a Russian GLONASS. After receiving the geographic location sent by the positioning system, the positioning apparatus 108 sends the information to the processor 101 for processing, or sends the information to the memory 103 for storage. In some other embodiments, the positioning apparatus 108 may further be a receiver of an assisted global positioning system (AGPS). The AGPS system serves as an assisted server to assist the positioning apparatus 108 in completing ranging and positioning services. In this case, the assisted positioning server communicates with the positioning apparatus 108 (that is, a GPS receiver) of the terminal, for example, the mobile phone 100, through a wireless communications network, and provides positioning assistance. In some other embodiments, the positioning apparatus 108 may also be a positioning technology based on a access point. Each access point has a globally unique MAC address, and the terminal can scan and collect a broadcast signal of a surrounding Wi-Fi access point when Wi-Fi is enabled. Therefore, a MAC address broadcast by the Wi-Fi access point can be obtained. The terminal sends such data (for example, the MAC address) that can identify the Wi-Fi access point to a location server through the wireless communications network. The location server retrieves a geographical location of each Wi-Fi access point, calculates a geographical location of the terminal with reference to strength of the Wi-Fi broadcast signal, and sends the geographical location of the terminal to the positioning apparatus 108 of the terminal.

The audio circuit 109, a speaker 113, and a microphone 114 may provide audio interfaces between the user and the mobile phone 100. The audio circuit 109 may transmit, to the speaker 113, an electrical signal converted from received audio data, and the speaker 113 converts the electrical signal into a sound signal and outputs the sound signal. In addition, the microphone 114 converts a collected sound signal into an electrical signal, and the audio circuit 109 receives the electrical signal and converts the electrical signal into audio data, and outputs the audio data to the RF circuit 102 to send the audio data to, for example, another mobile phone, or outputs the audio data to the memory 103 for further processing.

The peripheral interface 110 is configured to provide various interfaces for an external input/output device (for example, a keyboard, a mouse, a display externally connected to the mobile phone, an external memory, or a subscriber identity module card). For example, the terminal is connected to the mouse by using a universal serial bus (USB) interface, and the terminal is connected, by using a metal contact on a card slot of the subscriber identity module card, to the subscriber identity module (SIM) card provided by a telecommunications operator. The peripheral interface 110 may be configured to couple the external input/output peripheral device to the processor 101 and the memory 103.

The mobile phone 100 may further include a power supply apparatus 111 (for example, a battery or a power supply management chip) that supplies power to the components. The battery may be logically connected to the processor 101 by using the power supply management chip, so that functions such as charging management, discharging management, and power consumption management are implemented by using the power supply apparatus 111.

Although not shown in FIG. 2, the mobile phone 100 may further include a camera (a front-facing camera and/or a rear-facing camera), a camera flash, a micro projection apparatus, a near field communication (NFC) apparatus, and the like. Details are not described herein.

Figure 4:
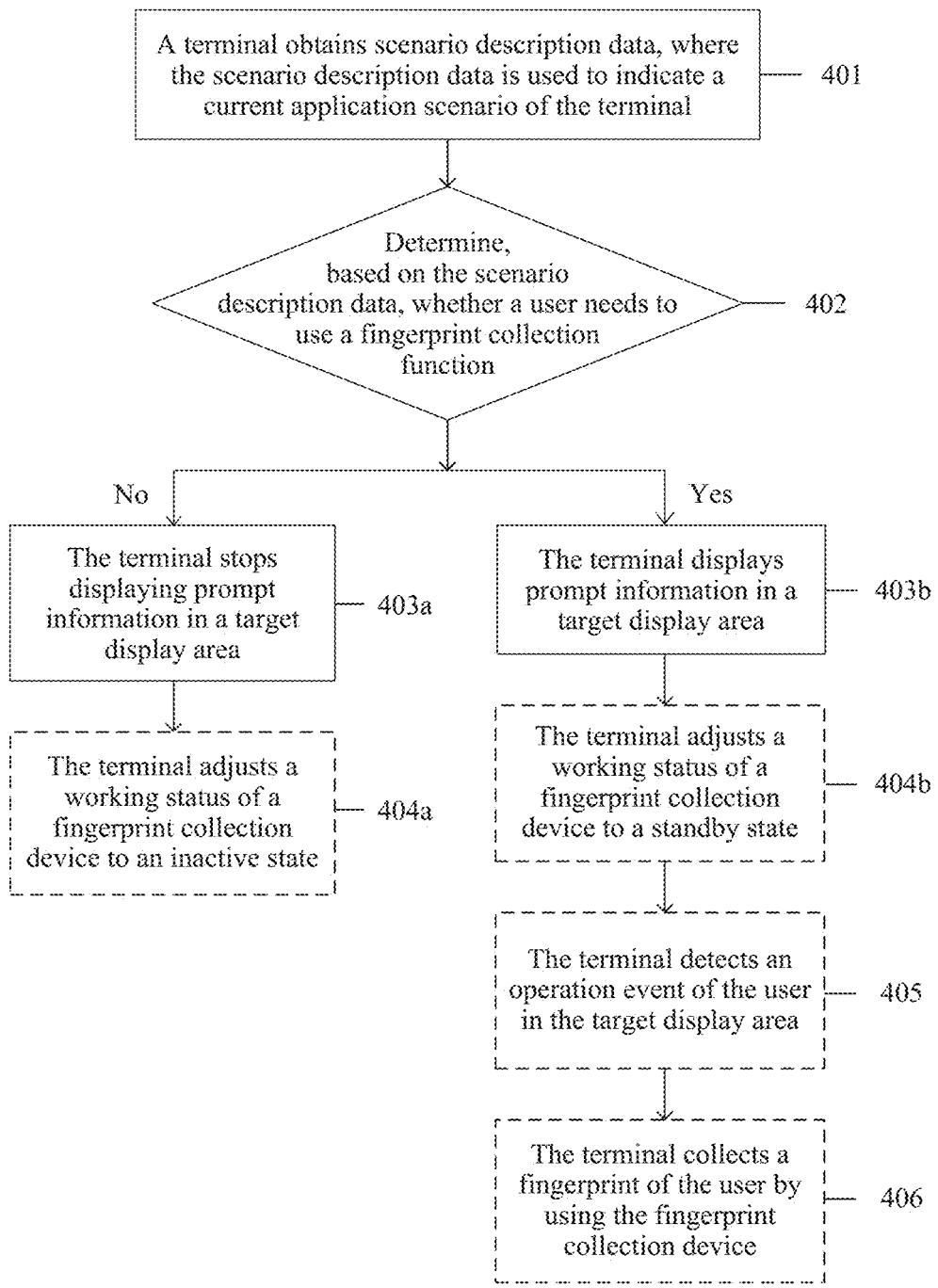
FIG. 4 is a schematic flowchart of a display processing method according to an embodiment of the present invention.

The following describes in detail the display processing method provided in the embodiments of the present invention with reference to a specific embodiment. As shown in FIG. 4, the method includes the following steps.

401. A terminal obtains scenario description data, where the scenario description data is used to indicate a current application scenario of the terminal.

Specifically, when a scenario in which the terminal needs to collect a fingerprint exists in a running process, for example, when the terminal runs an application that has a fingerprint payment function, or when the terminal is in a lock screen state or a black screen state (a user may need to unlock a screen of the terminal by using a fingerprint), the terminal may be triggered to obtain current scenario description data.

The scenario description data may be specifically at least one of the following: a distance between a user's finger and a touchscreen, data of touching an area outside a target display area by the user, posture information of a user when the user uses the terminal, intensity of current ambient light, a working status of an earpiece, a working status of an optical proximity sensor, and the like. The data reflects a current application scenario of the terminal, for example, a call scenario and a floating touch scenario. In this way, the terminal may further determine, based on the scenario description data, whether the user needs to use a fingerprint collection function in the current application scenario of the terminal.

For example, when the foregoing scenario description data includes the distance between the user's finger and the touchscreen, a distance identification sensor may be disposed in the terminal. In this way, the terminal may obtain the distance between the user's finger and the touchscreen by using the distance identification sensor. Alternatively, the touchscreen of the terminal has a floating touch function. When the user's finger is close to the touchscreen, a capacitive device in the touchscreen may determine a distance between the user's finger and the touchscreen based on a change of a capacitance signal, and the terminal may determine, based on the distance, whether the terminal is currently in a floating touch scenario.

A touch event performed by the user near the touchscreen may be referred to as a floating touch. The floating touch may mean that the user does not need to directly touch a touchpad for selecting, moving, or dragging an object (for example, an icon), and the user only needs to be near the terminal to perform a desired function.

Figure 5:
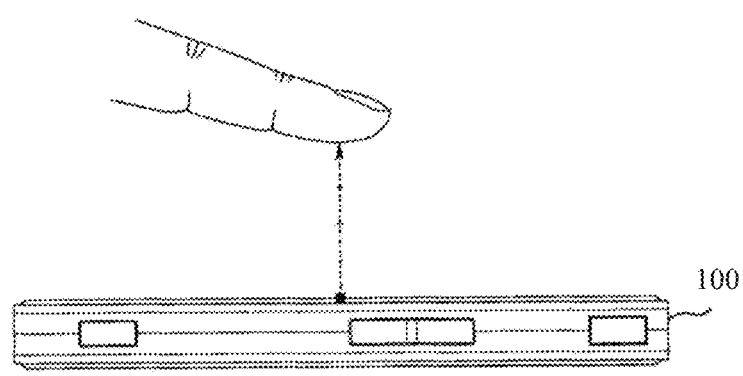
FIG. 5 is a schematic diagram of an application scenario of a floating touch according to an embodiment of the present invention.

For example, two capacitive sensors: a mutual-capacitance sensor and a self-capacitance sensor, may be disposed on the touchpad of the terminal 100, and the two capacitive sensors may be alternately arranged on the touchpad in a form of an array. The mutual-capacitance sensor is configured to implement a normal conventional multi-point touch. The self-capacitance sensor can generate a stronger signal than the mutual-capacitance sensor, so that finger sensing farther from the touchpad is detected. Therefore, as shown in FIG. 5, when the user's finger is suspended above the screen, because a signal generated by the self-capacitance sensor is greater than a signal generated by the mutual-capacitance sensor, so that the terminal 100 can detect a gesture of the user above the screen, for example, 20 mm above the touchpad.

Alternatively, when the foregoing scenario description data includes the data of touching an area outside the target display area by the user, once it is detected that the user's finger touches an area outside the target display area, for example, an area on the touchscreen different from the target display area or a frame of the terminal, the terminal may use a capacitive signal or the like generated in the touch process as the foregoing touch data, and the terminal may determine a gesture of the user based on the touch data.

Alternatively, when the foregoing scenario description data includes the posture information of the user when the user uses the terminal, the terminal may obtain a value of a gyroscope and/or an acceleration sensor that are/is disposed in the terminal, and use the value as the posture information of the user when the user uses the terminal. The posture information may reflect a posture of the user currently using the terminal, for example, a running posture, or a lifting posture of picking up the terminal.

Alternatively, an optical proximity sensor may be disposed in the terminal. In this case, the foregoing scenario description data includes a detection value of the optical proximity sensor. In this way, the terminal may determine, by using the optical proximity sensor, intensity of current ambient light and whether the terminal is currently shielded. For example, when the user places the terminal in a pocket, intensity of ambient light obtained by the optical proximity sensor approaches 0, and the terminal may detect that a light shielding object is disposed around the terminal.

Alternatively, the foregoing scenario description data may further include the working status of the earpiece. When it is detected that the earpiece is playing sound, the user is using the terminal to make a call, that is, the terminal is currently in a call state.

It should be noted that, when the terminal does not run in a fingerprint-related scenario, it indicates that the terminal does not need to collect a fingerprint. Therefore, a working status of a fingerprint collection device may be directly adjusted to an inactive state. For example, a power supply of the fingerprint collection device is turned off, or the fingerprint collection device is switched to a sleep state. In this way, even if a finger is pressed on the fingerprint collection device, the fingerprint collection device does not collect a fingerprint, so as to avoid an unintentional operation caused when the user unintentionally touches the fingerprint collection device during an operation on the screen, and power consumption of the terminal can be reduced.

402. The terminal determines, based on the scenario description data, whether a user needs to use a fingerprint collection function.

In some embodiments of the present invention, when the terminal is in a black screen state, if a trigger event performed by the user on the terminal is detected, and it is determined that the trigger event is a preset operation (for example, a floating gesture, pressing a power button, or a double-tap operation) of waking up a terminal screen, it indicates that the user intentionally wakes up or unlocks the terminal screen. Therefore, the terminal may determine that the user needs to use the fingerprint collection function in this case.

For example, when the terminal is in a black screen state, if a distance between the user's finger and the touchscreen falls within a first threshold range, for example, within 1 cm, it indicates that the user intends to touch the touchscreen. In this case, it is necessary to first wake up or unlock the terminal screen through fingerprint recognition. Therefore, the terminal may determine that the user needs to use the fingerprint collection function in this case.

For another example, when the terminal is in a black screen state, and when the touch data in the foregoing scenario description data is a preset touch gesture, for example, a gesture such as sliding, long pressing, pressure pressing, or tapping, it indicates that the user intends to wake up or unlock the terminal screen. Therefore, the terminal may determine that the user needs to use the fingerprint collection function in this case.

In some other embodiments of the present invention, when the posture information in the foregoing scenario description data is used to indicate that the user picks up the terminal, for example, when the acceleration sensor of the terminal detects that an amount of a current acceleration change is within a preset threshold range for picking up a mobile phone, it indicates that the user picks up the terminal and prepares to use the terminal in this case. In this case, it is necessary to first wake up or unlock the terminal screen through fingerprint recognition. Therefore, the terminal may determine that the user needs to use the fingerprint collection function in this case.

In some other embodiments of the present invention, the foregoing scenario description data may further be a real-time signal received by the terminal. In this case, if the real-time signal received by the terminal is a new incoming call event or a new message event, it may also be determined that the user needs to use the fingerprint collection function in this case.

It may be understood that, when at least one of the following conditions is met: the distance between the user's finger and the touchscreen falls within the first threshold range, the touch data is the preset touch gesture, the foregoing posture information is used to indicate that the user picks up the terminal, and the real-time signal received by the terminal is a new incoming call event or a new message event, the terminal may determine that the user needs to use the fingerprint collection function in this case. When it is determined that the user needs to use the fingerprint collection function, the method may proceed to step 403b and step 404b.

Correspondingly, if the posture information in the foregoing scenario description data is used to indicate that the user holds the terminal while walking or running, it may be determined that the user does not need to use the fingerprint collection function in this case.

Alternatively, when the intensity of ambient light detected by the optical proximity sensor in the foregoing scenario description data falls within a second threshold range, for example, approaching to 0, and a light shielding object is disposed around the terminal, it indicates that the terminal is probably put into a pocket or a backpack by the user in this case. Therefore, the terminal may determine that the user does not need to use the fingerprint collection function in this case.

Alternatively, when the foregoing scenario description data indicates that the earpiece is playing sound, and the optical proximity sensor in the terminal detects that a light shielding object is disposed around the earpiece, it indicates that the user is using the terminal to make a call or play a voice in an earpiece mode. Therefore, the terminal may determine that the user does not need to use the fingerprint collection function in this case.

Alternatively, when the terminal is in a voice call state, if a distance sensor detects that an object exists within a preset distance from the terminal, and the optical proximity sensor detects that a light shielding object is disposed around the earpiece, it may also indicate that the user is using the terminal to make a call or play a voice in the earpiece mode. In this case, the terminal may determine that the user does not need to use the fingerprint collection function.

It may be understood that, when the foregoing posture information is used to indicate at least one of the following: the user holds the terminal while walking or running, the terminal is in a pocket mode, and the terminal is being used to make a call or play a voice in the earpiece mode, the terminal may determine that the user does not need to use the fingerprint collection function in this case. When it is determined that the user does not need to use the fingerprint collection function, the method may proceed to step 403a and step 404a.

403a. The terminal stops displaying prompt information in a target display area in which a fingerprint collection device is disposed, where the prompt information is used to prompt the user to enter a fingerprint in the target display area.

Figure 6:
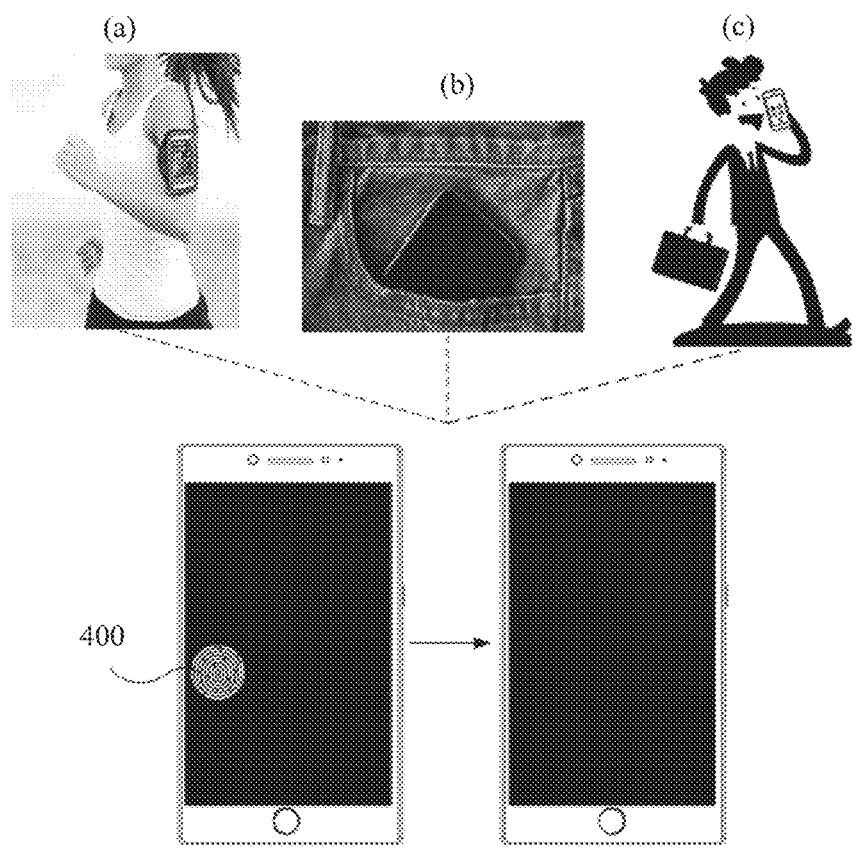
FIG. 6 is a schematic diagram 1 of an application scenario of a display processing method according to an embodiment of the present invention.

In step 403a, as shown in FIG. 6, when the posture information is used to indicate that the user holds the terminal while walking or running (shown in (a) in FIG. 6), or the terminal is in a pocket mode (shown in (b) in FIG. 6), or the terminal is being used to make a call or play a voice in the earpiece mode (shown in (c) in FIG. 6), the terminal may determine that the user does not need to use the fingerprint collection function in this case. In this case, if the display screen of the terminal originally displays prompt information in a target display area 400 in which a fingerprint collection device is disposed, the terminal may stop displaying the prompt information in this case, for example, hiding a fingerprint pattern that is being displayed in the target display area 400.

Certainly, if the terminal does not originally display the prompt information in the target display area, in this case, the terminal still remains in a black screen state, and does not need to inform the user on the display screen of a specific location for collecting a fingerprint, thereby reducing power consumption of the terminal, and avoiding screen burn-in.

404a. The terminal adjusts a working status of the fingerprint collection device to an inactive state.

In step 404a, when it is determined that the user does not need to use the fingerprint collection function in this case, the terminal may further adjust the working status of the fingerprint collection device to the inactive state.

For example, a power supply of the fingerprint collection device is turned off, the fingerprint collection device is adjusted to a sleep state, the fingerprint collection device is adjusted to a low power consumption state, or a scanning frequency for scanning the fingerprint collection device is reduced.

In this way, even if a finger is pressed on the fingerprint collection device, the fingerprint collection device does not collect the fingerprint, so as to avoid an unintentional operation caused when the user unintentionally touches the fingerprint collection device during an operation on the screen, and power consumption of the terminal can be reduced.

In addition, an execution sequence of step 403a and step 404a is not limited in this embodiment of the present invention. When the terminal determines that the user needs to use the fingerprint collection function, step 403a may be performed before step 404a, or step 404a is performed before step 403a, or step 403a and step 404a are performed at the same time. This is not limited in this embodiment of the present invention.

Correspondingly, when it is determined in step 402 that the user needs to use the fingerprint collection function, the method may proceed to the following step 403b and step 404b.

403b. The terminal displays prompt information in a target display area in which a fingerprint collection device is disposed, where the prompt information is used to prompt the user to enter a fingerprint in the target display area.

Figure 7A:
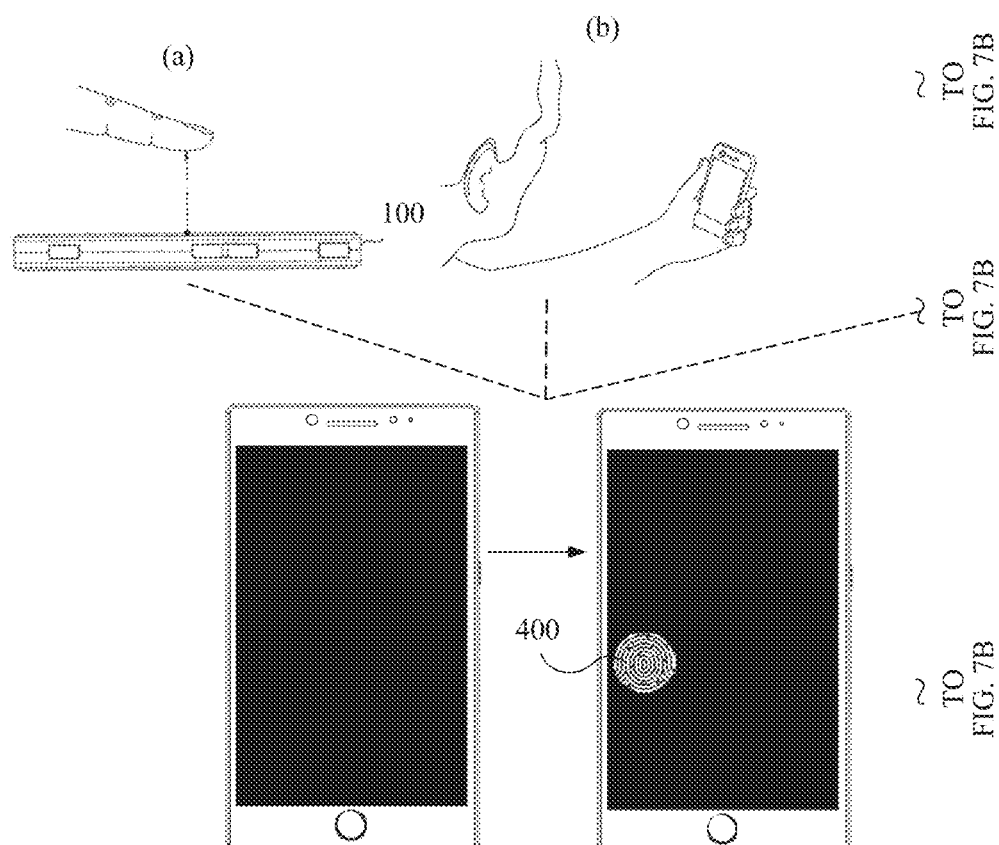
FIG. 7A and FIG. 7B are a schematic diagram 2 of an application scenario of a display processing method according to an embodiment of the present invention.
Figure 7B:

In step 403b, as shown in FIG. 7A and FIG. 7B, when the terminal detects that the trigger event performed by the user is a preset operation (a floating gesture shown in (a) in FIG. 7A) of waking up the terminal screen, or when the foregoing posture information is used to indicate that the user picks up the terminal (shown in (b) in FIG. 7A), or when the terminal receives a new incoming call event or a new message event (shown in (c) in FIG. 7B), the terminal may determine that the user needs to use the fingerprint collection function in this case. In this case, if the terminal is originally in a black screen state, the terminal outputs the prompt information in the target display area 400 in which the fingerprint collection device is disposed, so as to prompt the user to enter the fingerprint in the target display area.

For example, as shown in FIG. 7A and FIG. 7B, a fingerprint pattern may be displayed in the target display area 400 of the terminal, or the target display area 400 or an edge of the target display area 400 may be lighted by using different colors. Certainly, the user may be prompted, in an animation or text form, to enter the fingerprint in the target display area. This is not limited in this embodiment of the present invention.

In this way, the terminal may determine, in a timely and accurate manner based on the scenario description data, that the current user needs to use the fingerprint collection function, and further outputs the prompt information in the target display area 400 in which the fingerprint collection device is disposed, so that the user can accurately learn of a specific location for subsequently entering the fingerprint on the touchscreen, and recognition efficiency of fingerprint recognition on the screen is improved.

404b. The terminal adjusts a working status of the fingerprint collection device to a standby state.

In step 404b, when determining that the user needs to use the fingerprint collection function, the terminal may further adjust the working status of the fingerprint collection device to a standby state. For example, the fingerprint collection device is powered on, and waits for pressing by the user's finger. In this way, once the user's finger is pressed on the fingerprint collection device, the fingerprint collection device may immediately start collecting fingerprint information, thereby increasing a response speed of collecting a fingerprint by the terminal, Certainly, an execution sequence of step 403*b* and step 404*b* is not limited in this embodiment of the present invention. When the terminal determines that the user needs to use the fingerprint collection function, step 403*b* may be performed before step 404*b*, or step 404*b* is performed before step 403*b*, or step 403*b* and step 404*b* are performed at the same time. This is not limited in this embodiment of the present invention.

Optionally, still as shown in FIG. 4, after displaying the foregoing prompt information in the target display area, the terminal may further proceed to the following steps 405 and 406.

405. The terminal detects an operation event of the user in the target display area.

406. When the operation event meets a preset condition, the terminal collects a fingerprint of the user by using the fingerprint collection device in the target display area.

The preset condition includes at least one of the following: pressing force of the operation event is greater than a first preset value; duration of the operation event is greater than a second preset value; movement displacement of the operation event is greater than a third preset value; and a quantity of touch times of the operation event is greater than a fourth preset value.

In other words, when it is detected that the user operates the target display area of the touchscreen, the fingerprint collection device is triggered to collect the fingerprint of the user only when the operation event meets the preset condition. In this way, an unintentional operation caused when the user unintentionally touches the target display area and triggers the terminal to collect the fingerprint of the user can be avoided.

Figure 8:
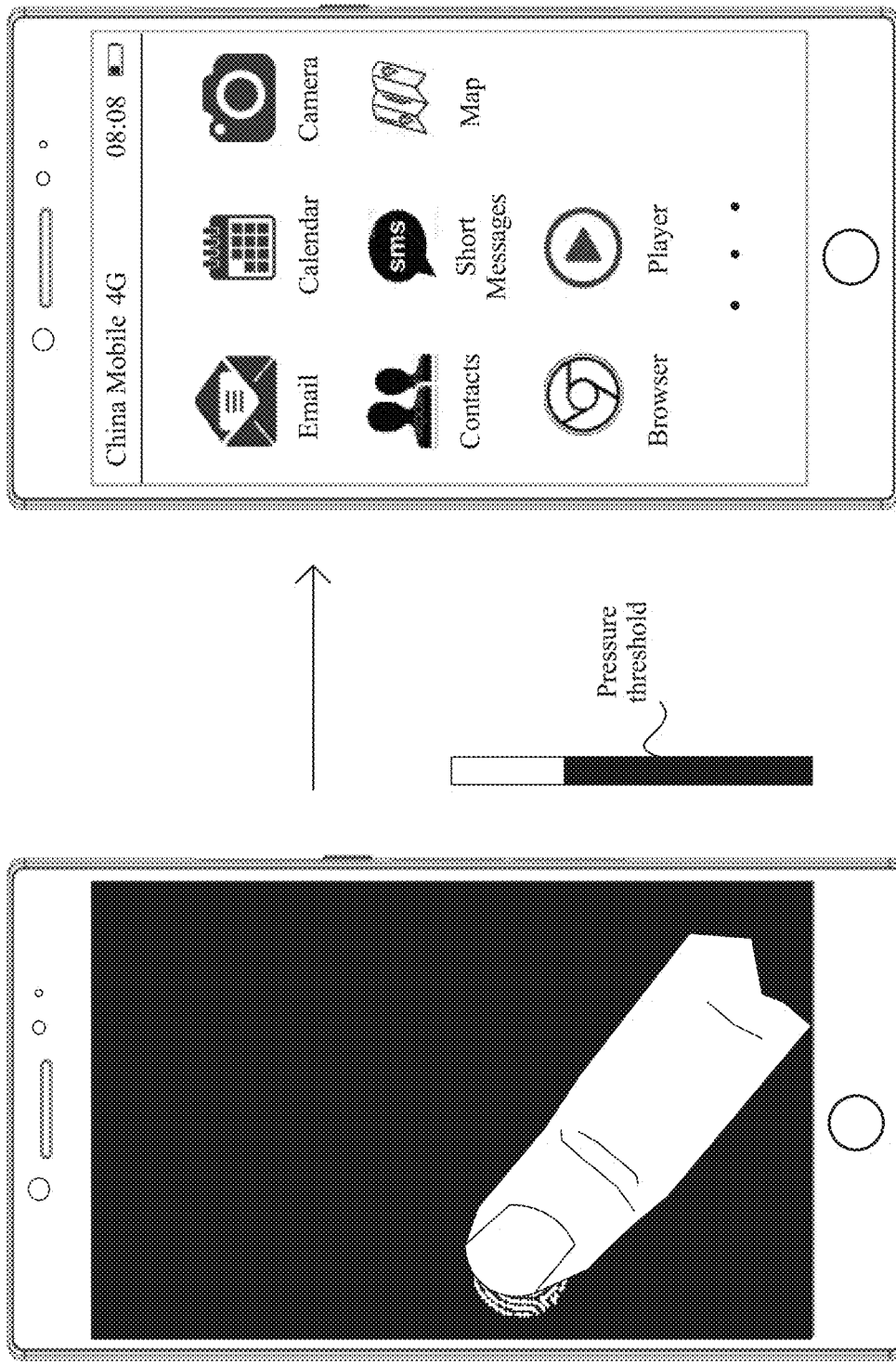
FIG. 8 is a schematic diagram 3 of an application scenario of a display processing method according to an embodiment of the present invention.

For example, as shown in FIG. 8, in a black screen state, when the user executes an operation event in the target display area, if the terminal detects that pressing force is greater than a preset pressure threshold (namely, the first preset value), it indicates that the user intentionally triggers the fingerprint collection function in this case. Further, the terminal collects a fingerprint of the user by using the fingerprint collection device in the target display area, attempts to authenticate a user identity based on the collected fingerprint, and unlocks the terminal screen after the authentication succeeds.

Figure 9:
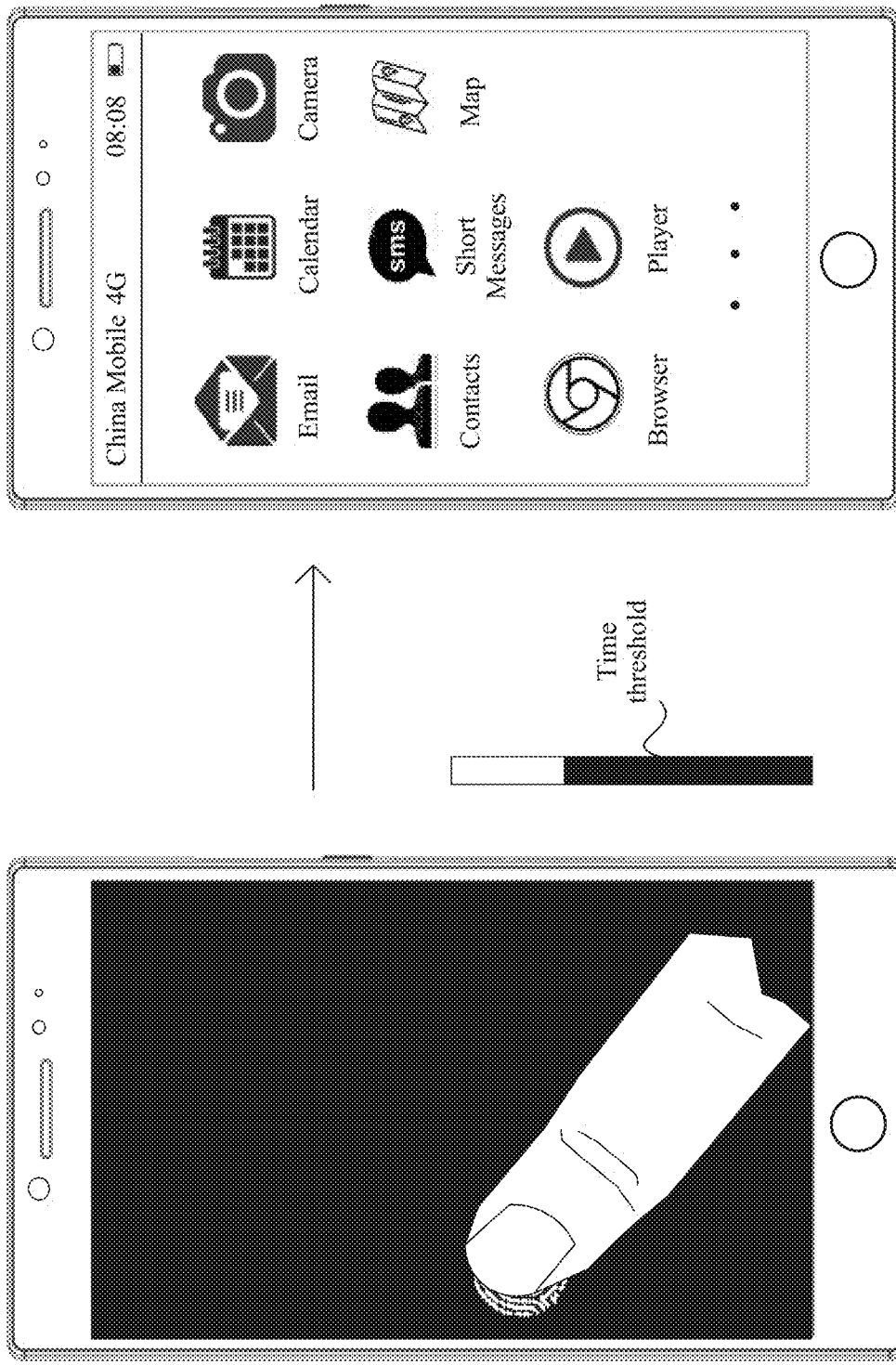
FIG. 9 is a schematic diagram 4 of an application scenario of a display processing method according to an embodiment of the present invention.

Alternatively, as shown in FIG. 9, in a black screen state, when the user executes an operation event in the target display area, if the terminal detects that a time period in which the user's finger stays in the target display area is greater than a preset time threshold (namely the second preset value), it indicates that the user intentionally triggers the fingerprint collection function in this case. Further, the terminal collects a fingerprint of the user by using the fingerprint collection device in the target display area, attempts to authenticate a user identity based on the collected fingerprint, and unlocks the terminal screen after the authentication succeeds.

Figure 10:
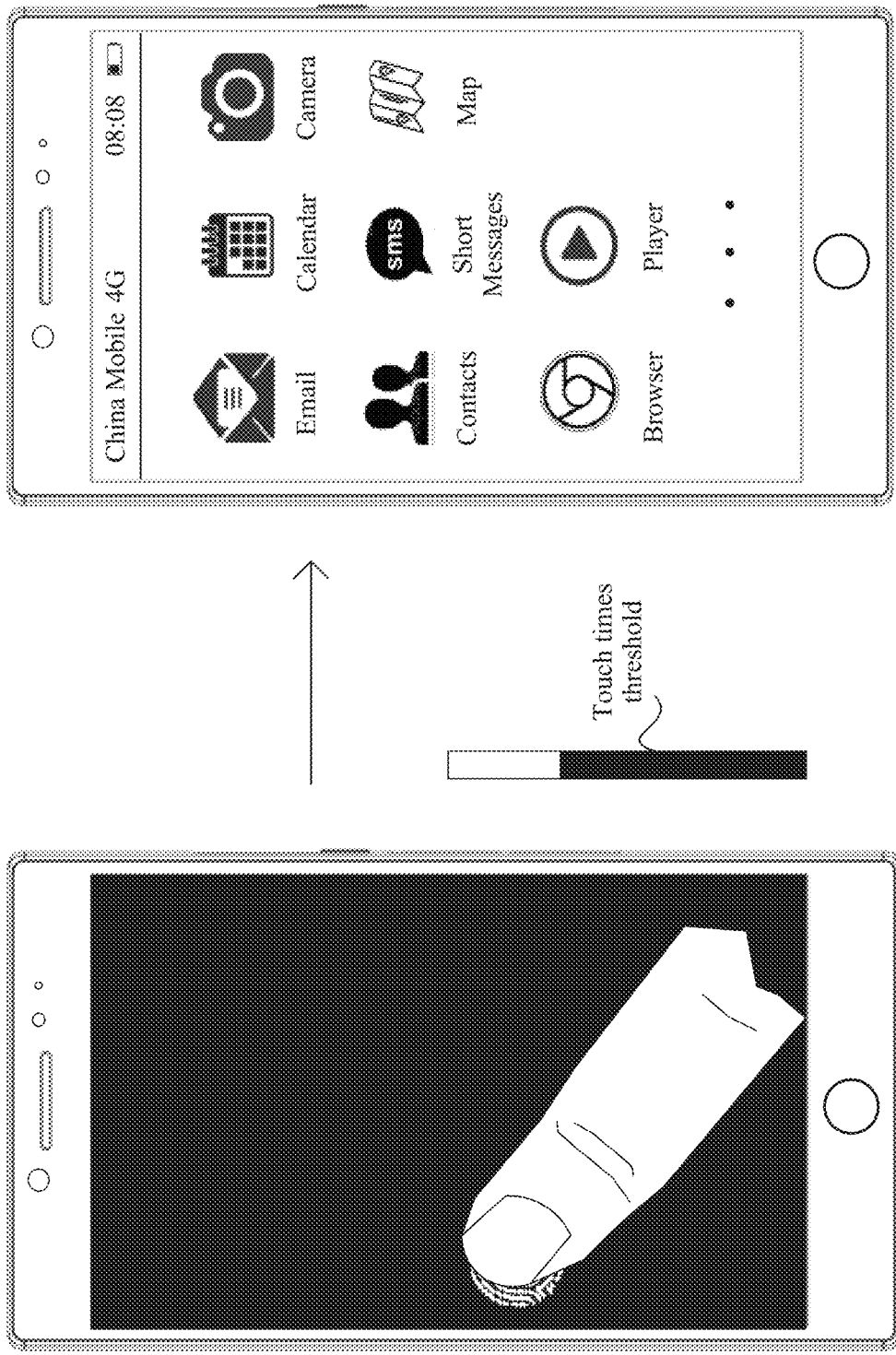
FIG. 10 is a schematic diagram 5 of an application scenario of a display processing method according to an embodiment of the present invention.

Alternatively, as shown in FIG. 10, in a black screen state, when the user executes an operation event in the target display area, if the terminal detects that a quantity of touch times of touching the target display area by the user is greater than a preset threshold of touch times (namely, the fourth preset value), it indicates that the user intentionally triggers the fingerprint collection function in this case. Further, the terminal collects a fingerprint of the user by using the fingerprint collection device in the target display area, attempts to authenticate a user identity based on the collected fingerprint, and unlocks the terminal screen after the authentication succeeds.

Figure 11:
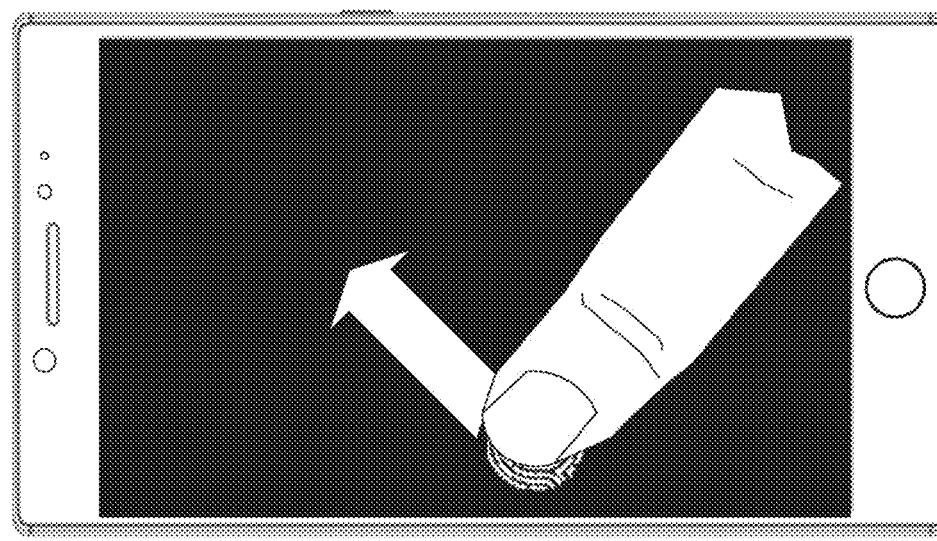
FIG. 11 is a schematic diagram 6 of an application scenario of a display processing method according to an embodiment of the present invention.
Figure 11:
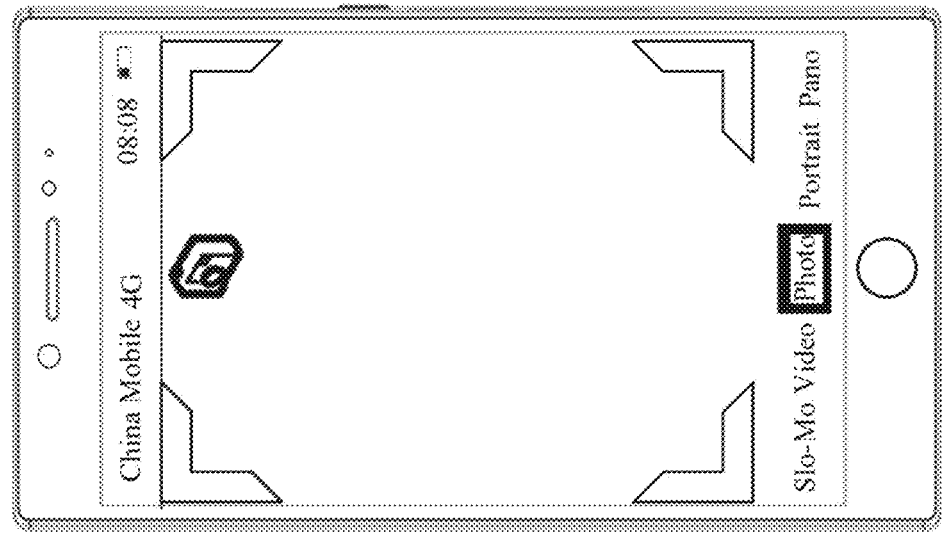

Alternatively, as shown in FIG. 11, in a black screen state, when the user executes an operation event in the target display area, if the terminal detects that a distance (that is, the movement displacement) of moving in a preset direction by the user's finger is greater than the third preset value, where the terminal may preset a correspondence between starting an application (for example, a camera) and an operation of moving the user's finger in the preset direction, the terminal may collect a fingerprint of the user by using the fingerprint collection device in the target display area, attempt to authenticate a user identity based on the collected fingerprint, and directly start and enter the camera application after the authentication succeeds. Therefore, the user can directly enter a related application by using the in-screen fingerprint collection function.

Figure 12:
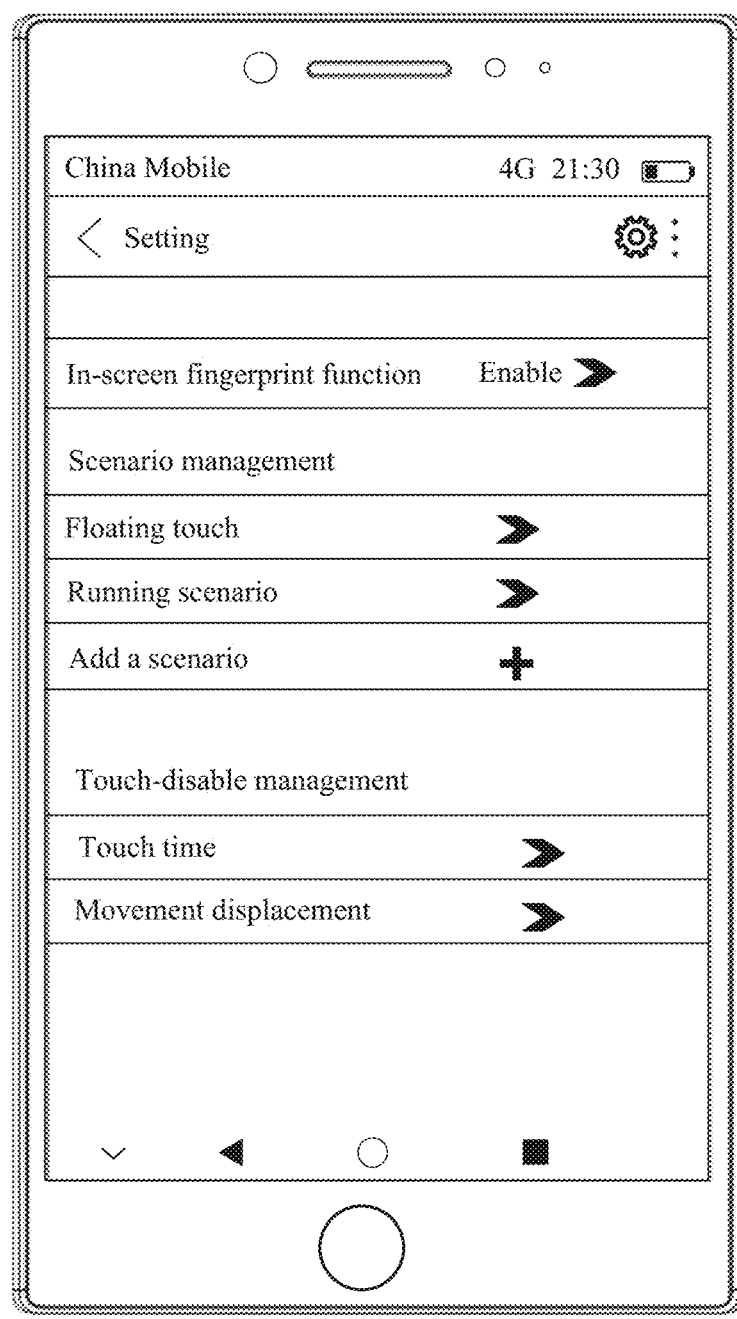
FIG. 12 is a schematic diagram 7 of an application scenario of a display processing method according to an embodiment of the present invention.

In addition, as shown in FIG. 12, the user may further enter a setting screen to manually set a related in-screen fingerprint function in the foregoing embodiment. For example, the in-screen fingerprint function is enabled or disabled. Alternatively, a scenario management option may be provided, and specific parameters about whether to output prompt information and how to output the prompt information in each application scenario may be set. Alternatively, a touch-disable management option may be further provided, and a specific touch parameter used when the user triggers the fingerprint collection device to work may be set. In this way, the user may perfect the foregoing in-screen fingerprint function based on a using habit of the user, so as to improve efficiency of collecting a fingerprint on a screen by the fingerprint collection device.

It may be understood that, to implement the foregoing method functions, the terminal includes corresponding hardware structures andior software modules for performing the functions. A person skilled in the art should be easily aware that units and algorithm steps in the examples described with reference to the embodiments disclosed in this specification may be implemented in a form of hardware or in a form of a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of the present invention, the terminal and the like may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in an actual implementation.

Figure 13:
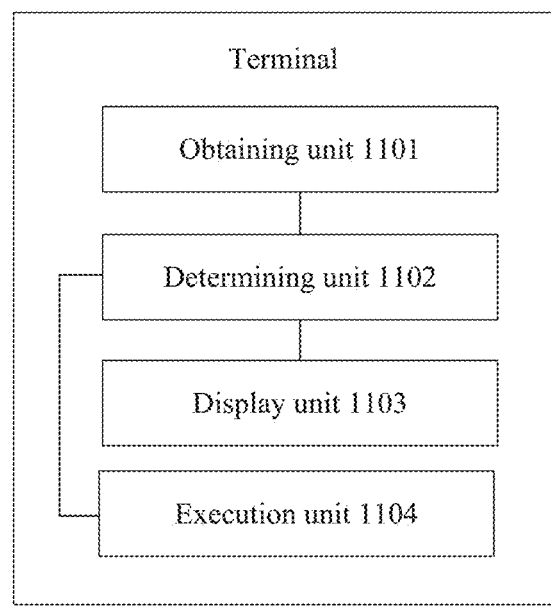
FIG. 13 is a schematic structural diagram 2 of a terminal according to an embodiment of the present invention.

When each functional module is obtained through division for each function, FIG. 13 is a possible schematic structural diagram of the terminal in the foregoing embodiment. The terminal is configured to implement the foregoing method embodiment, and includes an obtaining unit 1101, a determining unit 1102, a display unit 1103, and an execution unit 1104.

The obtaining unit 1101 is configured to support the terminal in performing the processes 401 and 405 in FIG. 4. The determining unit 1102 is configured to support the terminal in performing the process 402 in FIG. 4, The display unit 1103 is configured to support the terminal in performing the process 403*b* in FIG. 4. The execution unit 1104 is configured to support the terminal in performing processes 403*a* and 404*a*, 404*b*, and 406 in FIG. 4. For the functional descriptions of the corresponding functional modules, refer to any content related to the steps in the foregoing method embodiments. Details are not described herein again.

Figure 14:
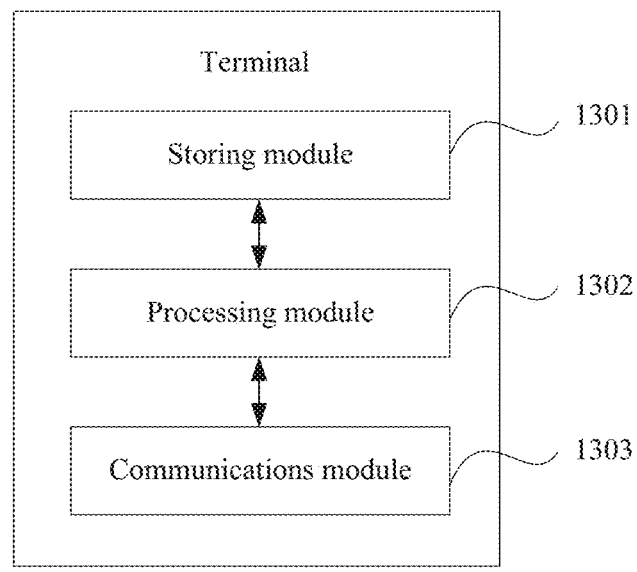
FIG. 14 is a schematic structural diagram 3 of a terminal according to an embodiment of the present invention.

When an integrated unit is used, FIG. 14 is a possible schematic structural diagram of the terminal in the foregoing embodiment. The terminal is configured to implement the foregoing method embodiment, and includes a processing module 1302 and a communications module 1303. The processing module 1302 is configured to control and manage an action of the terminal. The communications module 1303 is configured to support the terminal in communicating with another network entity. The terminal may further include a storage module 1301, configured to store program code and data of the terminal.

The processing module 1302 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The controller/processor may implement or execute various example logical blocks, modules, and circuits described with reference to content described in the present invention. Alternatively, the processor may be a combination of processors implementing a computing function, for example, a combination of one or more microprocessors, or a combination of the DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit, and the storage module 1301 is a memory, the terminal provided in this embodiment of the present invention may be the mobile phone 100 shown in FIG. 2.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A mobile phone, comprising:
a touch screen with an in-display fingerprint sensor;
a processor coupled to the touch screen and the in-display fingerprint sensor; and
a memory coupled to the processor and configured to store instructions, which cause the processor to be configured to:
   display, via the touch screen, a fingerprint pattern in a target display area in response to detecting a first tap when the touch screen is in a lock screen state or detecting that the mobile phone is picked up when the touch screen is in the lock screen state, wherein the fingerprint pattern is used to prompt a user to enter a fingerprint;
   receive a voice call when the touch screen is in the lock screen state while the fingerprint pattern is displayed in a target display area;
   remove the fingerprint pattern from the target display area to stop displaying the fingerprint pattern in the target display area in response to receiving a voice call when the touch screen is in the lock screen state;
   detect a second tap on the touch screen when the touch screen is in the lock screen state, while the mobile phone is in a voice call state; and
   maintain display, via the touch screen, of the target display area, with the fingerprint pattern being excluded from the target display area, in response to detecting the second tap on the touch screen when the touch screen is in the lock screen state, while the mobile phone is in the voice call state.

2. The mobile phone of claim 1, further comprising:
a proximity sensor coupled to the processor; and
an earpiece coupled to the processor,
wherein the instructions further cause the processor to be configured to:
   detect, using the proximity sensor, that an object is within a first distance from the earpiece, while the mobile phone is in the voice call state; and
   avoid displaying the fingerprint pattern in the target display area to keep the touch screen in the lock screen state when the proximity sensor detects that the object is within the first distance from the earpiece.

3. The mobile phone of claim 1, wherein, to display the fingerprint pattern in the target display area, the instructions further cause the processor to:
light up the target display area with a first color; and
light up an edge of the target display area with a second color, wherein the first color is different than the second color.

4. The mobile phone of claim 1, wherein the instructions further cause the processor to be configured to:
detect a floating gesture when the touch screen is in the lock screen state; and
display, via the touch screen, the fingerprint pattern in the target display area in response to detecting the floating gesture when the touch screen is in the lock screen state.

5. The mobile phone of claim 1, further comprising a power button, wherein the instructions further cause the processor to be configured to:
detect that the power button is pressed when the touch screen is in the lock screen state; and
display, via the touch screen, the fingerprint pattern in the target display area in response to detecting that the power button is pressed when the touch screen is in the lock screen state.

6. The mobile phone of claim 1, wherein the instructions further cause the processor to be configured to power on the in-display fingerprint sensor when the fingerprint pattern is displayed.

7. The mobile phone of claim 1, wherein the instructions further cause the processor to be configured to avoid activating the in-display fingerprint sensor in response to detecting the second tap on the touch screen when the touch screen is in the lock state, while the mobile phone is in a voice call state.

8. A non-transitory computer readable medium configured to store a computer program product comprising computer executable instructions that, when executed by a processor of a mobile device, cause the processor to:
display, via the touch screen, a fingerprint pattern in a target display area in response to detecting a first tap when the touch screen is in a lock screen state or detecting that the mobile phone is picked up when the touch screen is in the lock screen state, wherein the fingerprint pattern is used to prompt a user to enter a fingerprint;
receive a voice call when the touch screen is in the lock screen state while the fingerprint pattern is displayed in a target display area;
remove the fingerprint pattern from the target display area to stop the fingerprint pattern from being displayed in the target display area in response to receiving a voice call when the touch screen is in the lock screen state;
detect a second tap on the touch screen when the touch screen is in the lock screen state, while the mobile phone is in a voice call state; and
maintain display, via the touch screen, of the target display area, with the fingerprint pattern being excluded from the target display area, in response to detecting the second tap on the touch screen when the touch screen is in the lock screen state, while the mobile phone is in the voice call state.

9. The non-transitory computer readable medium of claim 8, wherein the computer executable instructions further cause the processor to:
detect, using a proximity sensor of the mobile phone, that an object is within a first distance from an earpiece of the mobile phone, while the mobile phone is in the voice call state; and
avoid displaying the fingerprint pattern in the target display area to keep the touch screen in the lock screen state when the proximity sensor detects that the object is within the first distance from the earpiece.

10. The non-transitory computer readable medium of claim 8, wherein to display the fingerprint pattern in the target display area, the computer executable instructions further cause the processor to:
light up the target display area with a first color; and
light up an edge of the target display area with a second color, wherein the first color is different than the second color.

11. The non-transitory computer readable medium of claim 8, wherein the computer executable instructions further cause the processor to:
detect a floating gesture when the touch screen is in the lock screen state; and
display, via the touch screen, the fingerprint pattern in the target display area in response to detecting the floating gesture when the touch screen is in the lock screen state.

12. The non-transitory computer readable medium of claim 8, wherein the computer executable instructions further cause the processor to be configured to avoid activating the in-display fingerprint sensor in response to detecting the second tap on the touch screen when the touch screen is in the lock state, while the mobile phone is in a voice call state.

13. The non-transitory computer readable medium of claim 8, wherein the computer executable instructions further cause the processor to:
detect that a power button of the mobile phone is pressed when the touch screen is in the lock screen state; and
display, via the touch screen, the fingerprint pattern in the target display area in response to detecting that the power button is pressed when the touch screen is in the lock screen state.

14. The non-transitory computer readable medium of claim 8, wherein computer executable instructions further cause the processor to power on an in-display fingerprint sensor when the fingerprint pattern is displayed.

15. An electronic device, comprising:
a touch screen with an in-display fingerprint sensor;
a processor coupled to the touch screen and the in-display fingerprint sensor; and
a non-transitory computer-readable medium storing instructions that, when executed by the processor, are configured to cause the electronic device to:
detect a first tap on the touch screen when the touch screen is in a lock screen state;
display, via the touch screen, a fingerprint pattern in the target display area in response to detecting the first tap when the touch screen is in the lock screen state, wherein the fingerprint pattern is used to prompt a user to enter a fingerprint;
detect that the electronic device is picked up when the touch screen is in the lock screen state;
display, via the touch screen, the fingerprint pattern in the target display area in response to detecting that the electronic device is picked up when the touch screen is in the lock screen state;

detect a second tap on the touch screen when the touch screen is in the lock state, while the mobile phone is in a voice call state; and avoid activating the in-display fingerprint sensor in response to detecting the second tap on the touch screen when the touch screen is in the lock state, while the mobile phone is in a voice call state.

16. The electronic device of claim 15, further comprising:

a proximity sensor; and an earpiece, wherein the instructions further cause the electronic device to:

detect, using the proximity sensor, that an object is within a first distance from the earpiece, while the electronic device is in a voice call state; and avoid displaying the fingerprint pattern in the target display area to keep the touch screen in the lock screen state when the proximity sensor detects that the object is within the first distance from the earpiece.

17. The electronic device of claim 15, wherein, to display the fingerprint pattern in the target display area, the instructions further cause the electronic device to:

light up the target display area with a first color; and light up an edge of the target display area with a second color, wherein the first color is different than the second color.

18. The electronic device of claim 15, wherein the instructions further cause the electronic device to:

detect a floating gesture when the touch screen is in the lock screen state; and display, via the touch screen, the fingerprint pattern in the target display area in response to detecting the floating gesture when touch screen is in the lock screen state.

19. The electronic device of claim 15, further comprising a power button, wherein the instructions further cause the electronic device to:

detect that the power button is pressed when the touch screen is in the lock screen state; and display, via the touch screen, the fingerprint pattern in the target display area in response to detecting the power button is pressed when the touch screen is in the lock screen state.

* * * * *